United States Patent
Marburger (10) Patent No.: US 11,534,906 B2
(45) Date of Patent: Dec. 27, 2022

(54) MULTI-AXIS ALIGNMENT TOOLS AND TECHNIQUES

(71) Applicant: Jason A. Marburger, Spokane, WA (US)

(72) Inventor: Jason A. Marburger, Spokane, WA (US)

(73) Assignee: FIREBALL TOOL WORKS LLC, Sante Fe Springs, CA (US)

( * ) Notice: Subject to any disclaimer, the term of this patent is extended or adjusted under 35 U.S.C. 154(b) by 45 days.

(21) Appl. No.: 17/317,054

(22) Filed: May 11, 2021

(65) Prior Publication Data

US 2022/0362925 A1 Nov. 17, 2022

(51) Int. Cl.
*B25H 7/00* (2006.01)

(52) U.S. Cl.
CPC ...................................... *B25H 7/00* (2013.01)

(58) Field of Classification Search
CPC ....................................................... B25H 7/00
See application file for complete search history.

(56) References Cited

U.S. PATENT DOCUMENTS

| | | | | |
|---|---|---|---|---|
| 2,911,022 A * | 11/1959 | Brown | ..................... | B25B 5/142 269/1 |
| 4,085,515 A * | 4/1978 | Darden | ..................... | G01C 9/20 33/642 |
| 5,855,073 A | 1/1999 | Boelling | | |
| 6,729,033 B2 | 5/2004 | Jevons et al. | | |
| 6,860,475 B2 | 3/2005 | Wong | | |
| 7,475,488 B2 * | 1/2009 | Symington | ......... | E04F 21/1838 33/645 |
| 7,591,076 B2 | 9/2009 | Varnedoe | | |
| 8,448,348 B1 * | 5/2013 | Jones | ................... | E04G 21/1891 33/760 |
| 9,062,467 B1 | 6/2015 | Hanson | | |
| 2002/0121027 A1 * | 9/2002 | Kruskamp | .......... | E04F 21/0092 33/645 |
| 2003/0079427 A1 * | 5/2003 | Mackay | ................ | E04B 1/2604 52/261 |
| 2009/0090012 A1 * | 4/2009 | Varnedoe | ........... | B23K 37/0443 33/475 |
| 2015/0218832 A1 * | 8/2015 | Peters | ....................... | E04B 5/12 269/46 |
| 2016/0032598 A1 * | 2/2016 | Anderson | ........... | E04F 21/0092 206/349 |
| 2016/0046001 A1 | 2/2016 | Clark et al. | | |
| 2018/0021939 A1 * | 1/2018 | Illingworth | .............. | B25H 7/02 33/354 |

(Continued)

OTHER PUBLICATIONS

"3-Axis Welders Angle Clamp, Large", Trick-Tools, Van Sant Enterprises, Inc. [online][retrieved May 19, 2021]. Retrieved from the Internet <https://www.trick-tools.com/StrongHand-3-Axis-Welders-Angle-Clamp-Large-WAC45-SW-8068>., 3 pages.

(Continued)

*Primary Examiner* — Yaritza Guadalupe-McCall
(74) *Attorney, Agent, or Firm* — FIG. 1 Patents (57) ABSTRACT

Multi-axis alignment tools are described. The tools are usable to arrange workpieces across a variety of different axes and orientations and to ensure consistent and durable alignment of various workpieces while providing access for working thereon, which is not possible using conventional tools.

20 Claims, 12 Drawing Sheets

(56) References Cited

U.S. PATENT DOCUMENTS

2019/0249409 A1\* 8/2019 Boyd .................... E04B 1/1912
2019/0366489 A1  12/2019 Jaffe

OTHER PUBLICATIONS

"3-Axis Welding Fixture-Jig-Holder. New lot 3mm Wall Thickness", eBay, seller diaperitis [online][retrieved May 5, 2021]. Retrieved from the Internet <https://www.ebay.com/itm/3-Axis-Welding-Fixture-Jig-Holder-New-lot-3mm-Wall-Thickness/184668798347?hash=item2aff1e3d8b:g:3klAAOSwlkBgMXJs>., 3 pages.

"8 Genuine speed squares X2", Genuine Metal Works [online][retrieved May 19, 2021]. Retrieved from the Internet<https://genuinemetalworks.com/products/9-speed-square>., 5 pages.

"Certiflat6 Corner Welding Square", The Eastwood Company [online][retrieved May 5, 2021]. Retrieved from the Internet <https://www.eastwood.com/certiflat-6-corner-welding-square.html>., 2019, 6 pages.

"Monster Square", Fireball Tool [online][retrieved May 5, 2021]. Retrieved from the Internet <https://fireballtool.com/monster-square/>., 16 pages.

"Poor mans welding squares", HomemadeTools.net Forum, uploaded by bobs409 [online][retrieved May 5, 2021]. Retrieved from the Internet <https://www.homemadetools.net/forum/poor-mans-welding-squares-73800>., Jul. 4, 2019, 4 pages.

Li, , "Mega Square", Fireball Tool [online][retrieved May 5, 2021]. Retrieved from the Internet <https://fireballtool.com/mega-square/>., 16 pages.

\* cited by examiner

MULTI-AXIS ALIGNMENT TOOLS AND TECHNIQUES

BACKGROUND

Welders, carpenters, and other people joining workpieces together often have a need to join the workpieces together at particular angles. A welder, for instance, may frequently need to weld metal workpieces together at specific angles and across different axes. However, a single welder cannot simultaneously hold two or more workpieces himself, align the workpieces to a specific angle, and ensure that the alignment does not change during the welding process.

Conventional tools for aligning workpieces, such as carpentry or speed squares, suffer from numerous limitations that reduce their utility. For example, while a speed square may provide a 90-degree angle, a speed square is substantially planar itself and does not provide flat planar edges on which to properly align workpieces. Further, a speed square lacks the ability to hold workpieces, and both the speed square and the workpiece must be manually held to ensure that an alignment does not change. Due to these limitations, a user of a speed square is often subjected to a time-consuming iterative process of aligning two workpieces with the speed square, removing the speed square, attaching the workpieces to one another, realigning the workpieces with the speed square, adjusting the attachment between the workpieces, and so on.

Thus, conventional tools and techniques lack the ability to quickly and accurately align workpieces in various scenarios, lack the ability to ensure that the alignment does not change during an operation upon a workpiece, and obstruct access to the point of joinder of workpieces.

SUMMARY

Multi-axis alignment tools are described. The tools are usable to arrange workpieces across a variety of different axes and orientations and to ensure consistent and durable alignment of various workpieces while providing access for working thereon, which is not possible using conventional tools.

This Summary introduces a selection of concepts in a simplified form that are further described below in the Detailed Description. As such, this Summary is not intended to identify essential features of the claimed subject matter, nor is it intended to be used as an aid in determining the scope of the claimed subject matter.

BRIEF DESCRIPTION OF THE DRAWINGS

The detailed description is described with reference to the accompanying figures. Entities represented in the figures may be indicative of one or more entities and thus reference may be made interchangeably to single or plural forms of the entities in the discussion.

DETAILED DESCRIPTION

Overview

Many conventional alignment tools are substantially planar, i.e. flat, and do not provide sufficient surfaces on which to align objects. Further, conventional alignment tools tend to obstruct user access to the objects being aligned, particularly around points of joinder. Additionally, conventional alignment tools lack the ability to hold objects to ensure that the objects are not unintentionally moved. Thus, many conventional alignment tools have been found to be unable to adequately align objects during operation upon a workpiece.

Accordingly, multi-axis alignment tools are described. In one example, a multi-axis alignment tool includes a first alignment member and a second alignment member that are interconnected to form different interior alignment surfaces and exterior alignment surfaces. Further, the multi-axis alignment tool includes alignment wings that extend outwardly from the first and second alignment members and provide additional exterior alignment surfaces. The interior alignment surfaces, for instance, enable workpiece arrangement within an interior of the workpiece alignment tool and across different axes, e.g., x, y, and z axes. Further, the exterior alignment surfaces enable workpiece arrangement on an exterior of the workpiece alignment tool and across different axes, e.g., x, y, and z axes. Example implementations of the workpiece alignment tool also include an access space defined between the first and second alignment members. The access space, for example, enables workpiece access from both an interior and an exterior of the workpiece alignment tool. Further, workpieces are placeable through the access space to extend between the interior and exterior regions of the multi-axis alignment tool. Generally, this provides for a multitude of different workpiece arrangements not provided by conventional tools for alignment workpieces.

In the following discussion, example multi-axis alignment tools are described that may employ the techniques described herein. Example scenarios are then described in which the example multi-axis alignment tools are utilized to align and/or hold example workpieces. Performance of the example scenarios is not limited to the example multi-axis alignment tools, and the example multi-axis alignment tools are not limited to performance of the example scenarios.

Multi-Axis Alignment Tools

Figure 1:
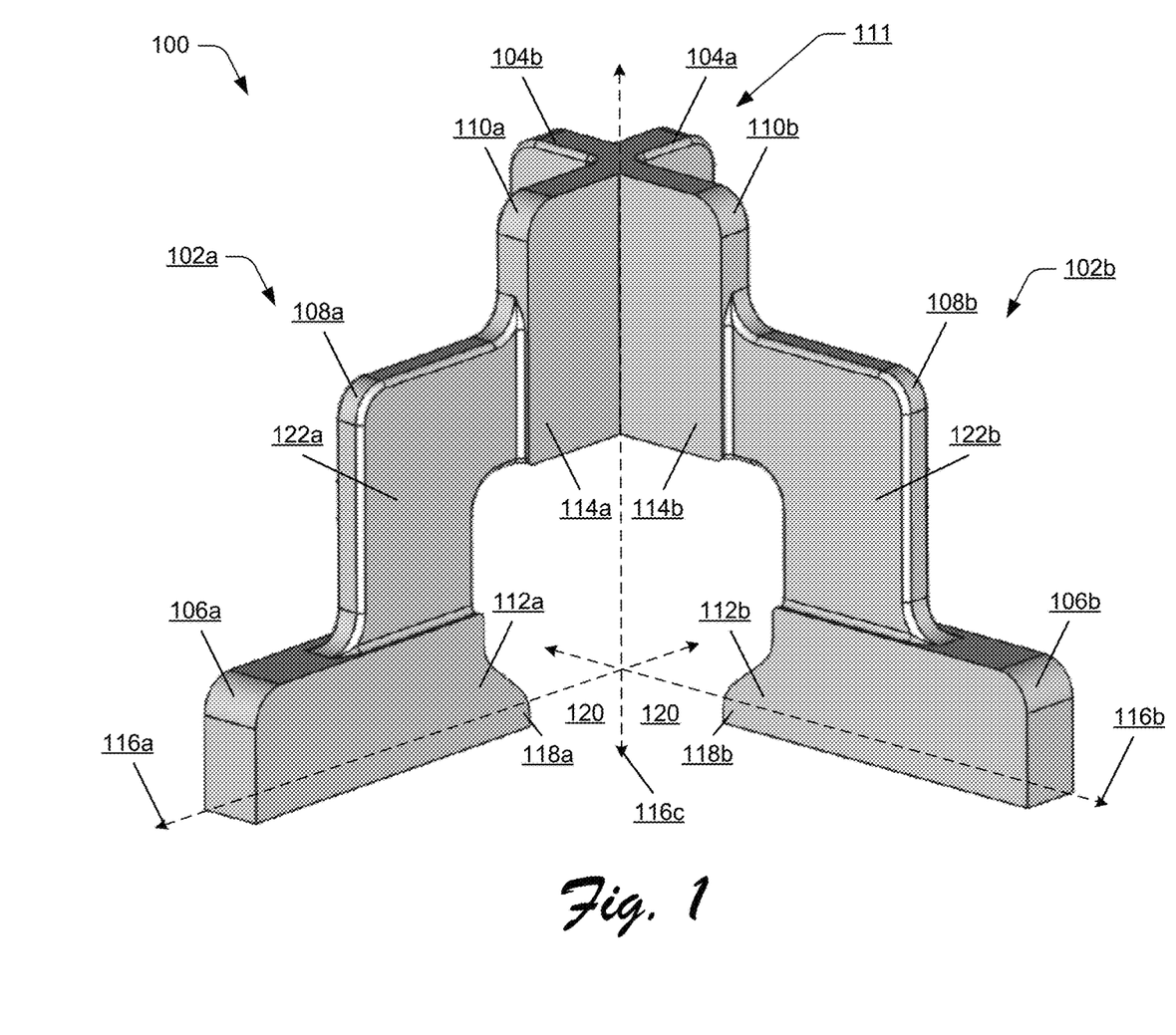
FIG. 1 depicts an interior view of a multi-axis alignment tool in accordance with one or more implementations.

FIGS. 1-11 depict various attributes of example multi-axis alignment tools that are operable to employ techniques described herein. FIG. 1 depicts an interior view of a multi-axis alignment tool 100 in accordance with one or more implementations described herein. The multi-axis alignment tool 100 includes a first alignment member 102a, a second alignment member 102b, a first alignment wing 104a, and a second alignment wing 104b. The first alignment member 102a includes a first foot 106a, a first spanning member 108a, and a first internal member 110a, and the second alignment member 102b includes a second foot 106b, a second spanning member 108b, and a second internal member 110b. In at least one implementation the first alignment wing 104a, the second alignment wing 104b, the first internal member 110a, and the second internal member 110b combine to form an x-shaped structure 111 that includes different alignment surfaces and that interconnects different portions of the multi-axis alignment tool 100. For instance, the first alignment wing 104a is formed codirectionally with the first internal member 110a and extends outwardly opposite the first internal member 110a, and the second alignment wing 104b is formed codirectionally with the second internal member 110b and extends outwardly opposite the second internal member 110b. In at least one implementation the first alignment member 102a and the second alignment member 102b are interconnected at the first internal member 110a and the second internal member 110b of the x-shaped structure 111. Further, the first foot 106a and the second foot 106b are not directly interconnected. The x-shaped alignment structure 111, for instance, represents a sole connectivity point for the first alignment member 102a and the second alignment member 102b. Further, in at least one implementation, a top surface of the x-shaped alignment structure is coplanar with a horizonal plane defined along the topmost portions of the internal members 110a, 110b, and the alignment wings 104a, 104b.

Further to the multi-axis alignment tool 100, the first foot 106a includes an internal surface 112a and the first internal member 110a includes an internal surface 114a. Further, the second foot 106a includes an internal surface 112b and the second internal member 110b includes an internal surface 114b. Generally, the internal surfaces 112a, 112b, 114a, 114b form different interior alignment surfaces of the multi-axis alignment tool 100 and can be combined in different ways to support workpiece alignment. For instance, and as depicted below, workpieces can be placed against the internal surfaces 112a, 112b, 114a, 114b to enable the workpieces to be worked upon and manipulated in various ways, such as for joining the workpieces.

Consider, for example, that the internal surface 112a represents an alignment surface defined codirectionally with an axis 116a, the internal surface 112b represents an alignment surface defined codirectionally with an axis 116b, and the internal surfaces 114a, 114b represent an alignment surface and/or separate alignment surfaces defined codirectionally with an axis 116c. The internal surfaces 114a, 114b, for instance, represent different alignment surfaces and/or are combinable into a single alignment surface. For example, the internal surfaces 114a, 114b are combinable to form a concave (e.g., V-shaped) internal alignment surface of the multi-axis alignment tool. In at least one implementation, the axes 116a, 116b, 116c, are normal to one another and/or represent axes in a cartesian coordinate system, e.g., x, y, z axes.

The first foot 106a includes a toe region 118a and the second foot 106b includes a toe region 118b. Generally, the toe regions 118a, 118b represent contoured portions of the respective first foot 106a and second foot 106b. Further, the multi-axis alignment tool 100 defines an access space 120 between the toes 118a, 118b, underneath the x-shaped structure 111, and adjacent the spanning members 108a, 108b. The toes 1108a, 118b, for instance, point inwardly toward the access space 120. As further described below, the access space 120 enables workpiece access from multiple regions of the multi-axis alignment tool 100.

Notice in this particular example that an interior surface 122a of the spanning member 108a and an interior surface 122b of the spanning member 108b are recessed relative to other portions of the alignment members 102a, 102b, respectively. For instance, the interior surface 122a is recessed (e.g., inset) relative to the internal surfaces 112a, 114a, and the interior surface 122b is recessed relative to the internal surfaces 112b, 114b. For example, a width of the spanning member 108a is less than widths of the foot 106a and the internal member 110a, and a width of the spanning member 108b is less than widths of the foot 106b and the internal member 110b.

Figure 2:
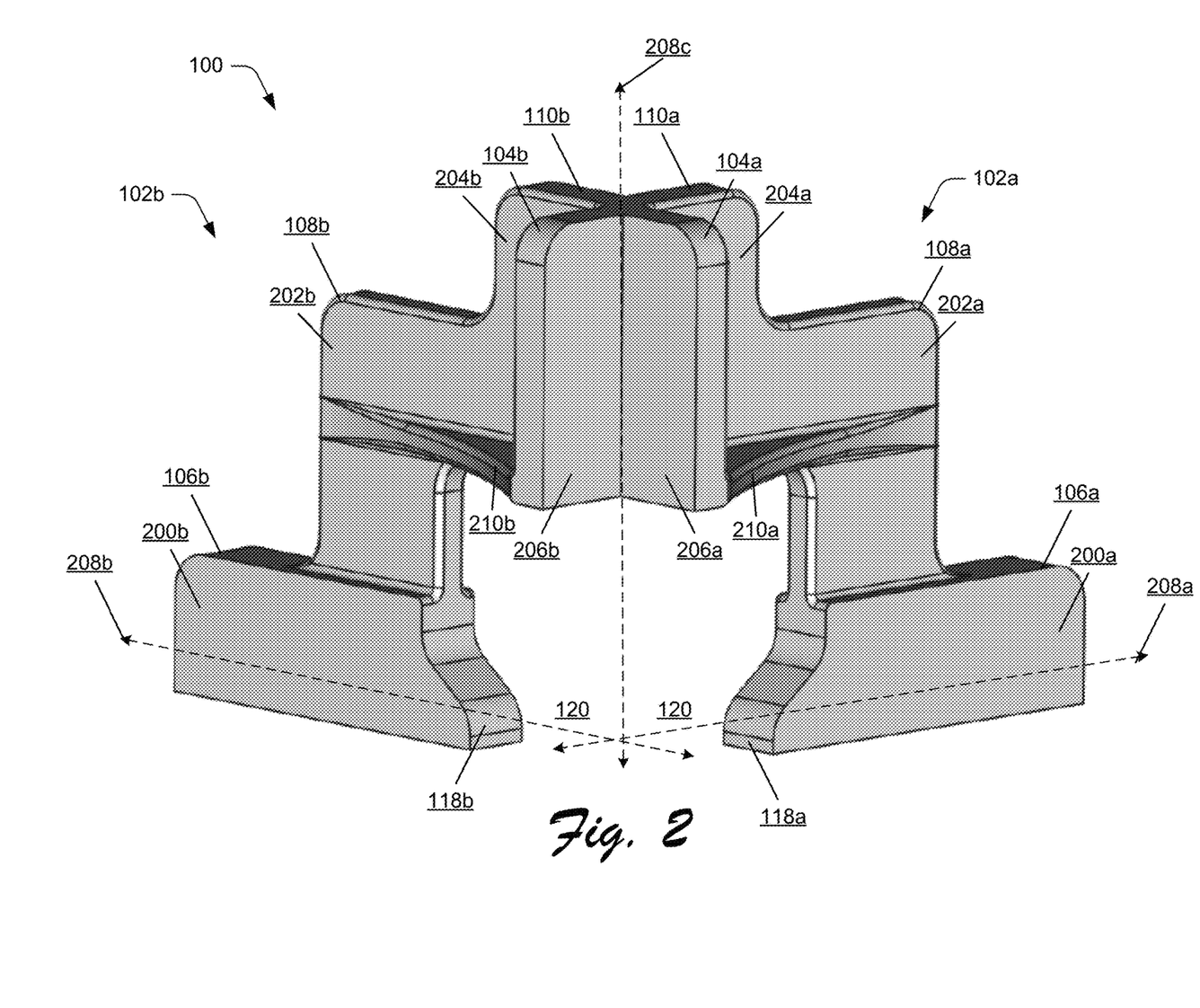
FIG. 2 depicts an exterior view of a multi-axis alignment tool in accordance with one or more implementations.

FIG. 2 depicts an exterior view of the multi-axis alignment tool 100 including the alignment members 102a, 102b and the alignment wings 104a, 104b. The rear view shows an external surface 200a of the first foot 106a, an external surface 200b of the second foot 106b, an external surface 202a of the spanning member 108a, and an external surface 202b of the spanning member 108b. Further, the internal member 110a includes an external surface 204a and the internal member 110b includes an external surface 204b. The alignment wing 104a includes an internal surface 206a and the alignment wing 104b includes an internal surface 206b.

Generally, the external surfaces 200a, 200b, and the internal surfaces 206a, 206b represent different alignment surfaces on the rear of the multi-axis alignment tool 100. Consider, for example, that the external surface 200a represents an alignment surface defined codirectionally with an axis 208a, the external surface 200b represents an alignment surface defined codirectionally with an axis 208b, and the internal surfaces 206a, 206b represent an alignment surface and/or separate alignment surfaces defined codirectionally with an axis 208c. The internal surfaces 206a, 206b for instance, represent different alignment surfaces and/or are combinable into a single alignment surface. For example, the internal surfaces 206a, 206b are combinable to form a concave (e.g., V-shaped) external alignment surface of the multi-axis alignment tool 100. In at least one implementation, the axes 208a, 208b, 208c, are normal to one another and/or represent axes in a cartesian coordinate system, e.g., x, y, z axes.

Also depicted in FIG. 2 is the access space 120 between the toes 118a, 118b. As further discussed below, the access space 120 enables a workpiece to be accessible via the interior surface and the exterior surface of the multi-axis alignment tool 100. In this particular example the multi-axis alignment tool 100 includes a reinforcement wing 210a and a reinforcement wing 210b that add structural reinforcement to the multi-axis alignment tool 100. For instance, the reinforcement wing 210a connects to the spanning member 108a, the internal member 110a, and the alignment wing 104a to provide structural reinforcement to the alignment wing 104*a*. Further, the reinforcement wing 210*b* connects to the spanning member 108*b*, the internal member 110*b*, and the alignment wing 104*b* to provide structural reinforcement to the alignment wing 104*b*. As further discussed below, however, in at least some implementations the reinforcement wings 210*a*, 210*b* are optional. For instance, consider the following example implementation.

Figure 3:
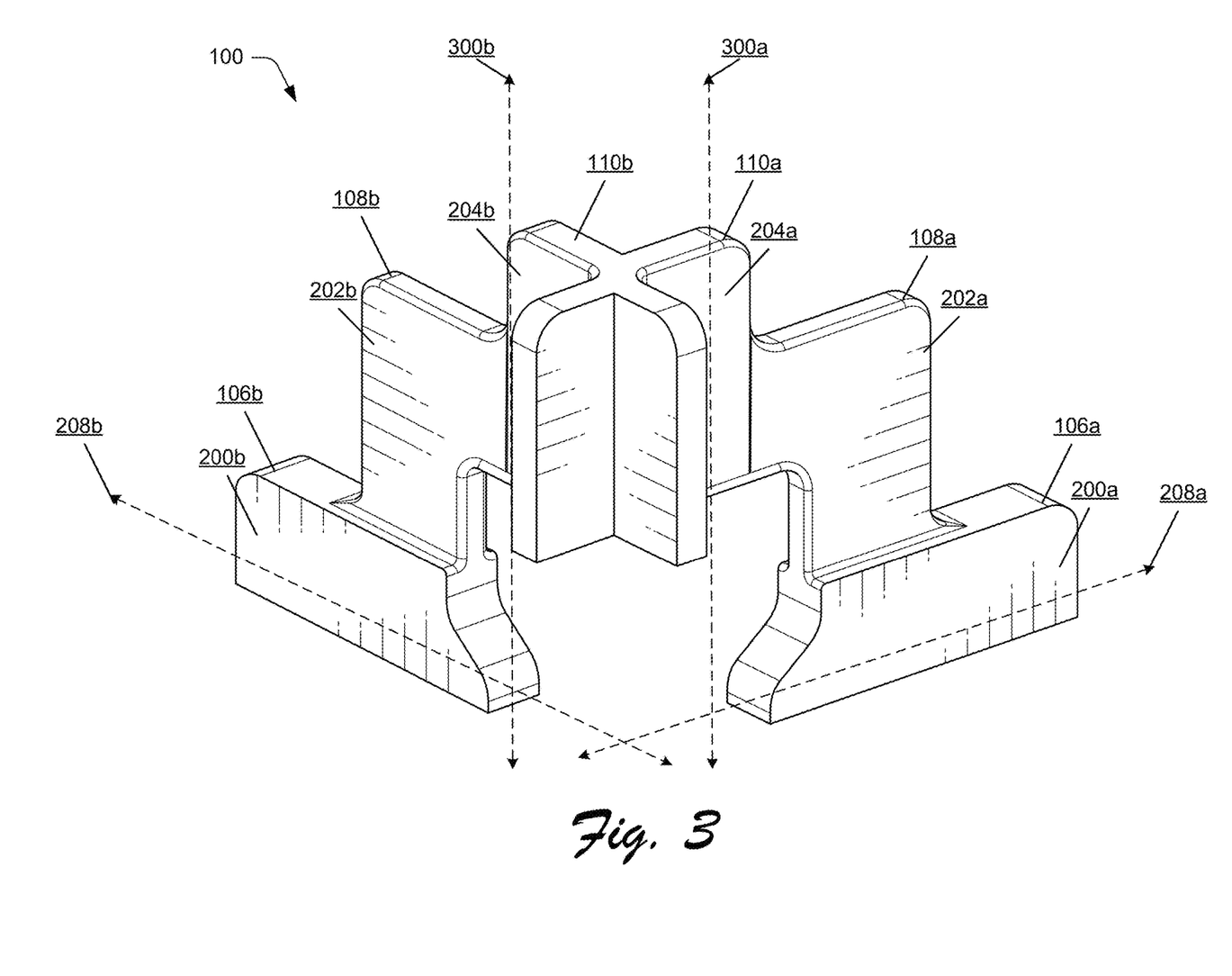
FIG. 3 depicts an exterior view of an implementation of a multi-axis alignment tool that does not include reinforcement wings in accordance with one or more implementations.

FIG. 3 depicts an exterior view of an implementation of the multi-axis alignment tool 100 that does not include the reinforcement wings 210*a*, 210*b*. In this particular implementation the external surface 204*a* of the internal member 110*a* and the external surface 204*b* of the internal member 110*b* represent different external alignment surfaces of the multi-axis alignment tool 100. Further, a vertical axis 300*a* extends vertically along the external surface 204*a* intersects the axis 208*a* that extends horizontally along the external surface 200*a* of the foot 106*a*, and a vertical axis 300*b* extends vertically along the external surface 204*b* intersects the axis 208*b* that extends horizontally along the external surface 200*b* of the foot 106*b*. The external surface 204*a* and the external surface 200*a*, for instance, are coplanar in a vertical plane that coincides with the axes 208*a*, 300*a*, and the external surface 204*b* and the external surface 200*b* are coplanar with a vertical plane that coincides with the axes 208*b*, 300*b*. Accordingly, a workpiece that is positioned vertically against the external surface 204*a* and along the axis 300*a* will intersect (e.g., be normal to) a workpiece that is position horizontally against the external surface 200*a* and along the axis 208*a*. Further, a workpiece that is positioned vertically against the external surface 204*b* and along the axis 300*b* will intersect (e.g., be normal to) a workpiece that is position horizontally against the external surface 200*b* and along the axis 208*b*.

In this particular implementation the external surface 202*a* of the spanning member 108*a* is recessed (e.g., inset) relative to the external surfaces 200*a*, 204*a*, and the external surface 202*b* of the spanning member 108*b* is recessed relative to the external surfaces 200*b*, 204*b*.

Figure 4:
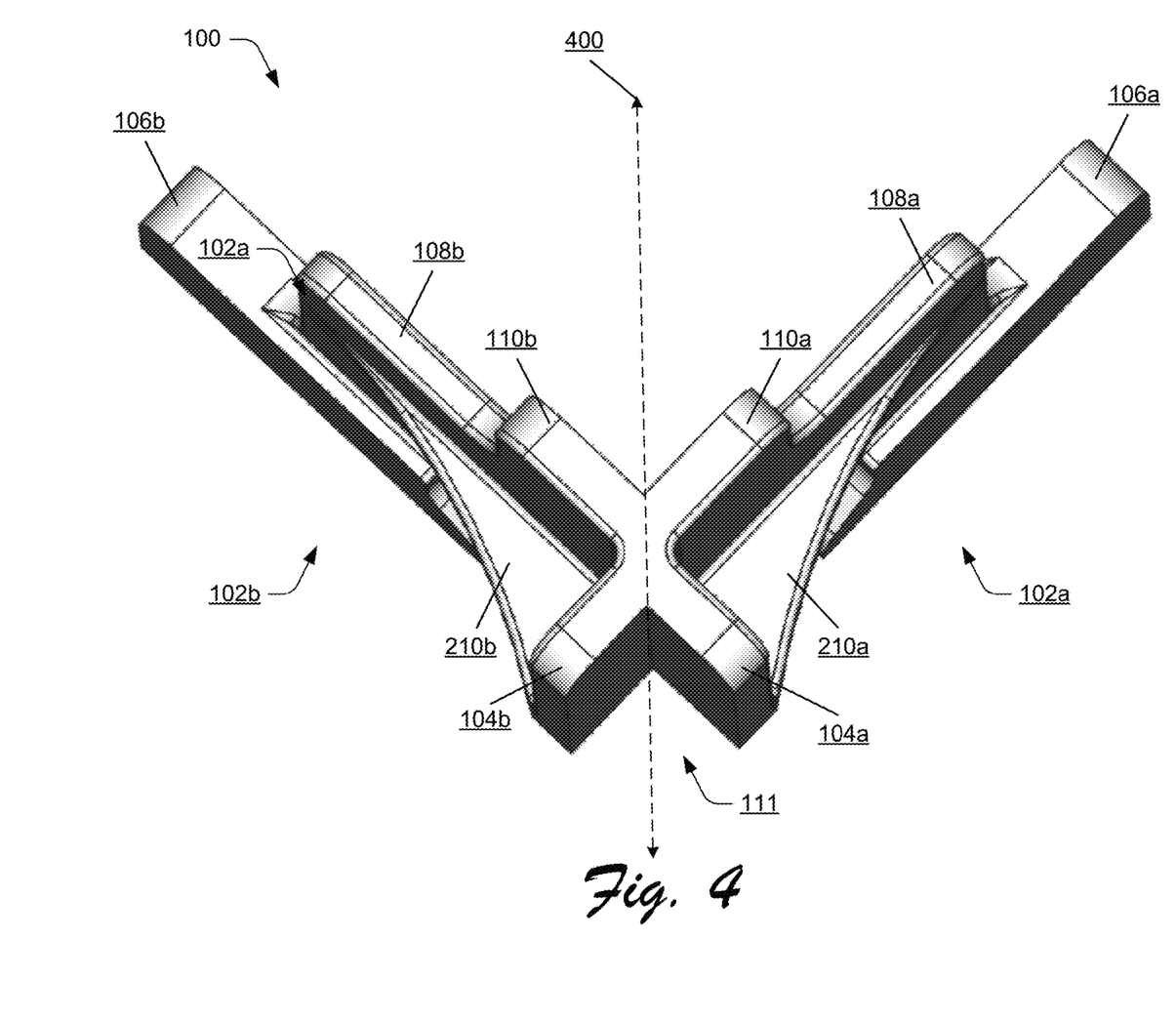
FIG. 4 depicts an overhead view of a multi-axis alignment tool including an x-shaped alignment structure in accordance with one or more implementations.

FIG. 4 depicts an overhead view of the multi-axis alignment tool 100 including the x-shaped alignment structure 111 that includes the internal members 110*a*, 110*b* and the alignment wings 104*a*, 104*b*. Further depicted are the alignment members 102*a*, 102*b*, the foot 106*a*, foot 106*b*, spanning members 108*a*, 108*b*, and the reinforcement wings 210*a*, 210*b*. In at least one implementation, the x-shaped alignment structure 111 exhibits mirror-image geometry relative to a vertical plane that extends vertically from an axis 400 and that bisects the x-shaped alignment structure 111.

Figure 5:
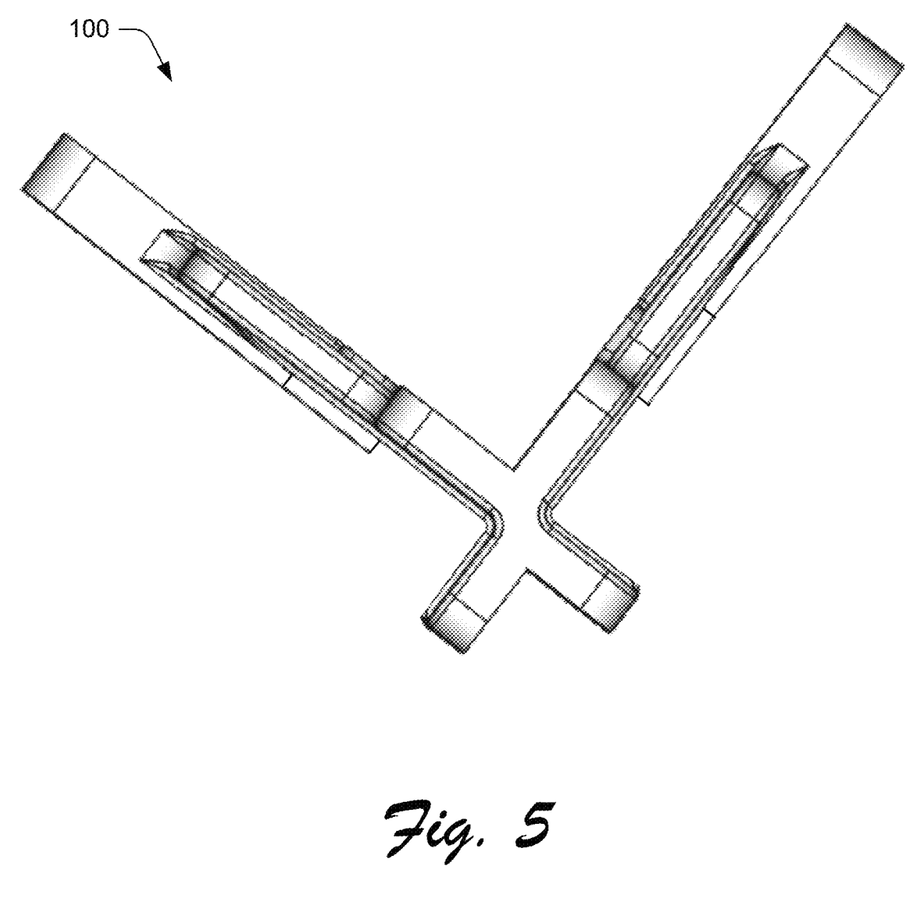
FIG. 5 depicts an overhead view of a multi-axis alignment tool without reinforcement wings in accordance with one or more implementations.

FIG. 5 depicts another overhead view of the multi-axis alignment tool 100 illustrating an example without the reinforcement wings 210*a*, 210*b*. The example illustrated in FIG. 5, for example, depicts an overhead view of the implementation depicted in FIG. 3.

Figure 6:
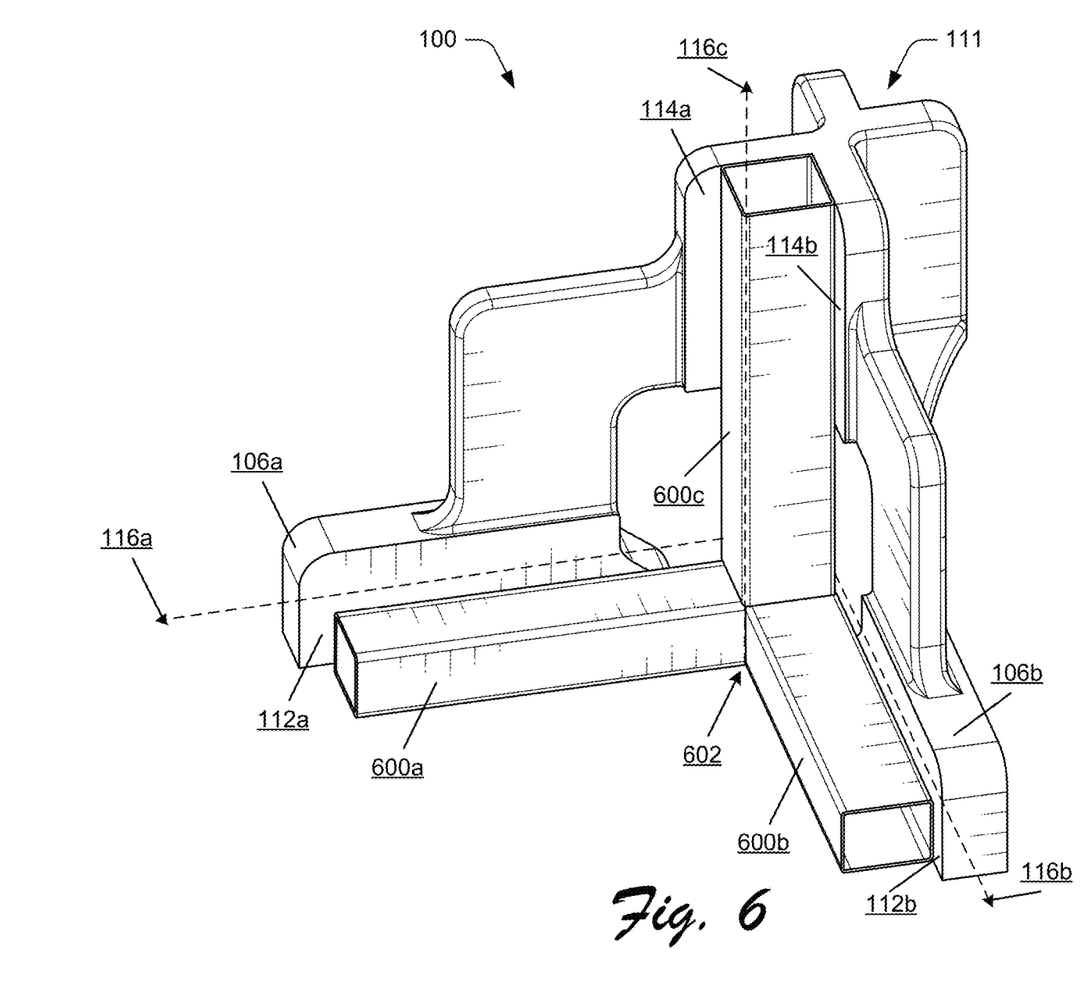
FIG. 6 depicts an implementation of a multi-axis alignment tool with several workpieces arranged relative to the multi-axis alignment tool in accordance with one or more implementations.

FIG. 6 depicts an implementation of the multi-axis alignment tool 100 with several workpieces 600 arranged relative to the multi-axis alignment tool 100. For instance, a workpiece 600*a* is placed against the internal surface 112*a* of the foot 106*a*, a workpiece 600*b* is placed against the internal surface 112*b* of the foot 106*b*, and a workpiece 600*c* is placed against the internal surfaces 114*a*, 114*b* of the x-shaped structure 111. As illustrated, the workpieces 600*a*-600*c* intersect at a junction 602 which enables the workpieces 600*a*-600*c* to be joined and/or otherwise worked upon at the junction 602. Thus, FIG. 3 depicts that the multi-axis alignment tool 100 enables workpiece arrangement and manipulation across multiple axes, e.g., the axes 116*a*, 116*b*, 116*c*.

Figure 7:
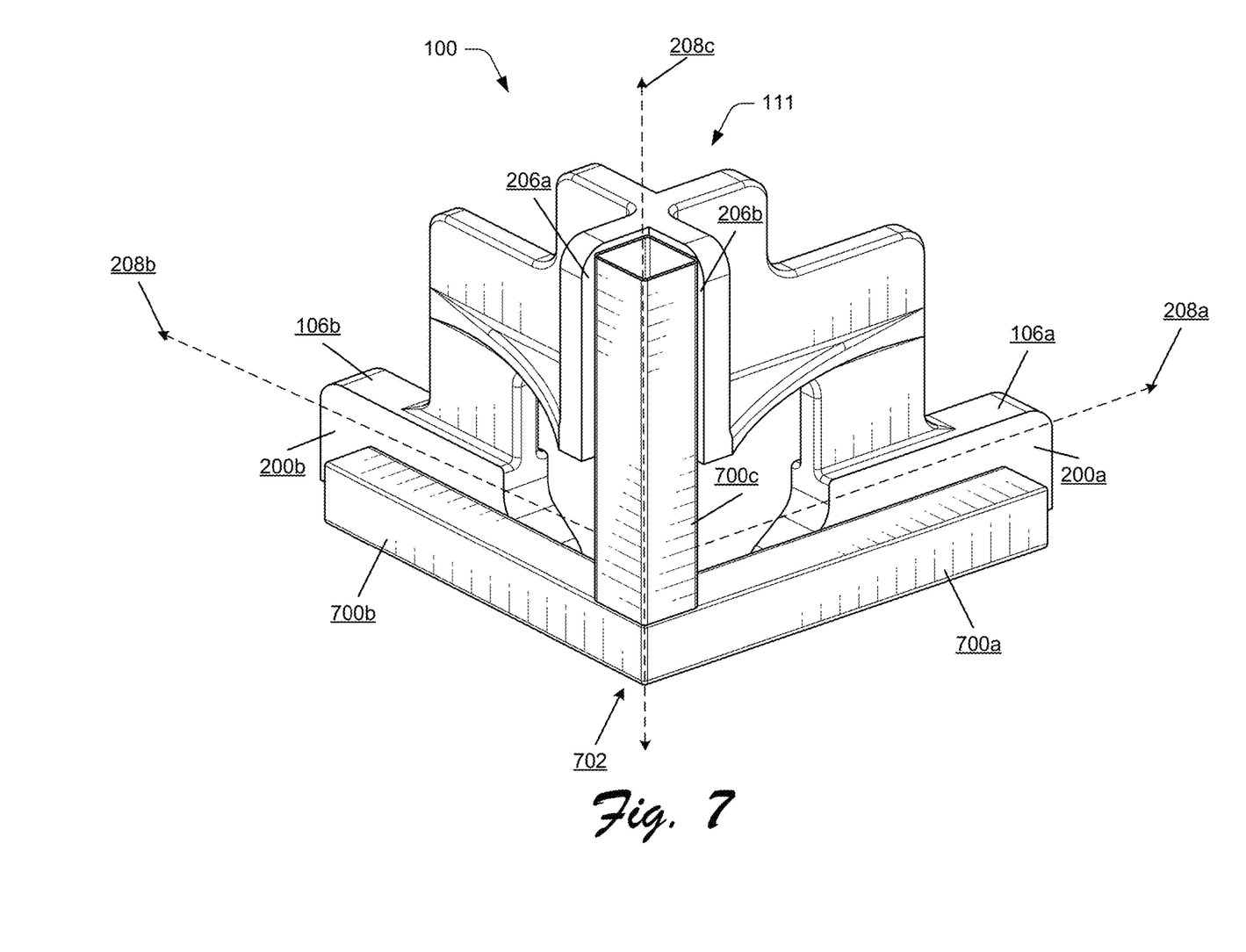
FIG. 7 depicts an implementation of a multi-axis alignment tool with several workpieces arranged relative to the multi-axis alignment tool in accordance with one or more implementations.

FIG. 7 depicts an implementation of the multi-axis alignment tool 100 with several workpieces 700 arranged relative to the multi-axis alignment tool 100. For instance, a workpiece 700*a* is placed against the external surface 200*a* of the foot 106*a*, a workpiece 700*b* is placed against the external surface 200*b* of the foot 106*b*, and a workpiece 700*c* is placed against the internal surfaces 206*a*, 206*b* of the x-shaped structure 111. As illustrated, the workpieces 700*a*-700*c* intersect at a junction 702 which enables the workpieces 700*a*-700*c* to be joined and/or otherwise worked upon at the junction 702. Thus, FIG. 3 depicts that the multi-axis alignment tool 100 enables workpiece arrangement and manipulation across multiple axes, e.g., the axes 116*a*, 116*b*, 116*c*.

Accordingly, FIGS. 6 and 7 illustrate that both internal and external surfaces of the multi-axis alignment tool 100 are usable to arrange workpieces and utilizing a variety of different geometric arrangements, e.g., different alignment axes.

Figure 8:
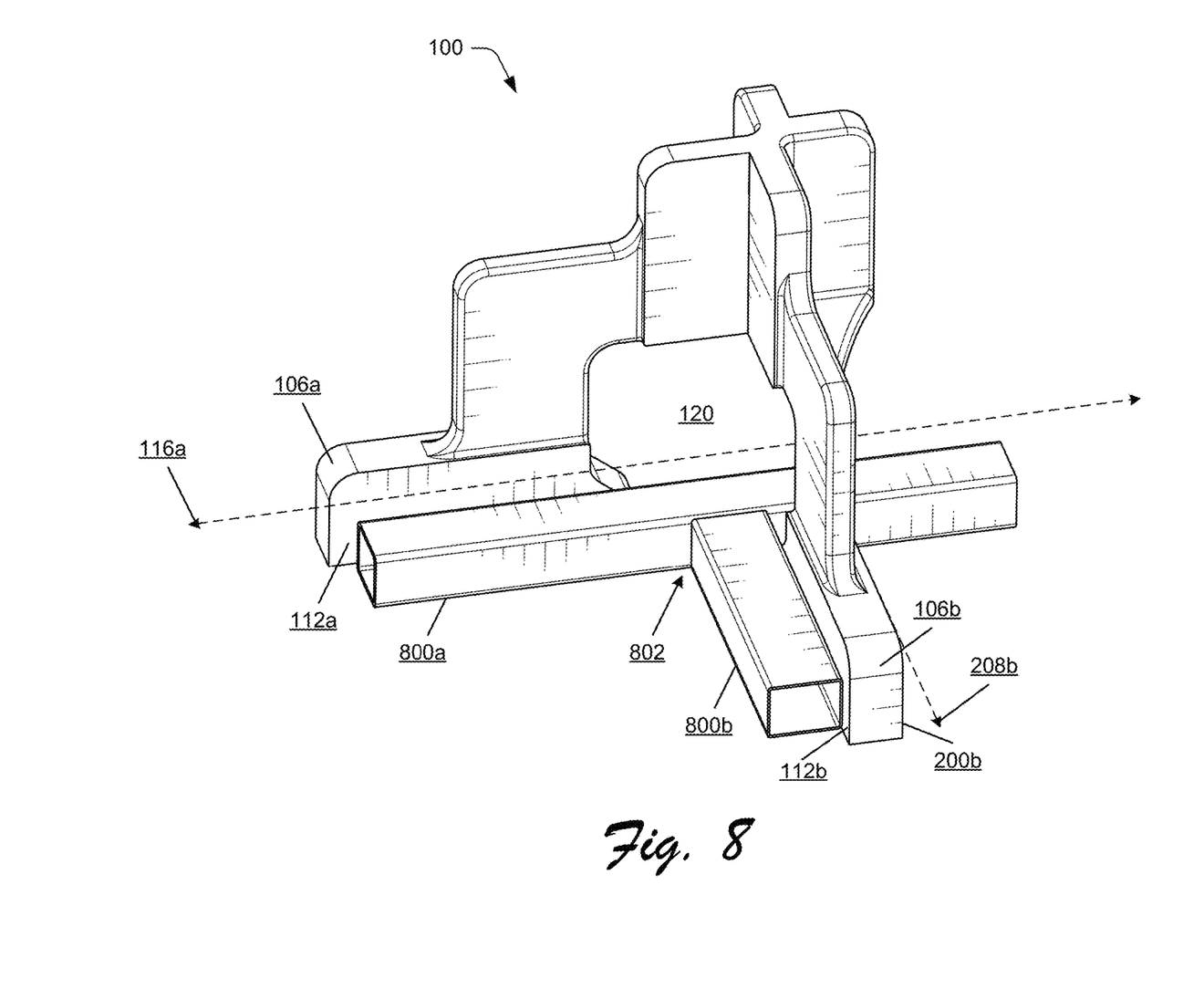
FIG. 8 depicts an implementation for arranging workpieces through an access space of a multi-axis alignment tool in accordance with one or more implementations.

FIG. 8 depicts an implementation for arranging workpieces through the access space 120. For instance, a workpiece 800*a* is placed against the internal surface 112*a* of the foot 106*a*, and a workpiece 800*b* is placed against the internal surface 112*b* of the foot 106*b*. Further, the workpieces 800*a*, 800*b* intersect at a junction 802, which enables the workpieces 800*a*, 800*b* to be joined at the junction 802.

Notice in this particular example the workpiece 800*a* extends through the access space 120. Generally, this enables a variety of different options for arranging and working up workpieces. For instance, this enables the workpiece 800*a* to be moved along the axis 116 such that the junction 802 can take various positions along the length of the workpiece 800*a*. Additionally or alternatively, a workpiece (not shown here) can be placed against the external surface 200*b* of the foot 106*b* to be joined to the workpiece 800*a*, e.g., along the axis 208*b*. Accordingly, the various scenarios depicted above illustrate that the multi-axis alignment tool 100 is usable to arrange workpieces across multiple different axes and alignment surfaces to provide for a variety of different workpiece arrangement scenarios.

Figure 9:
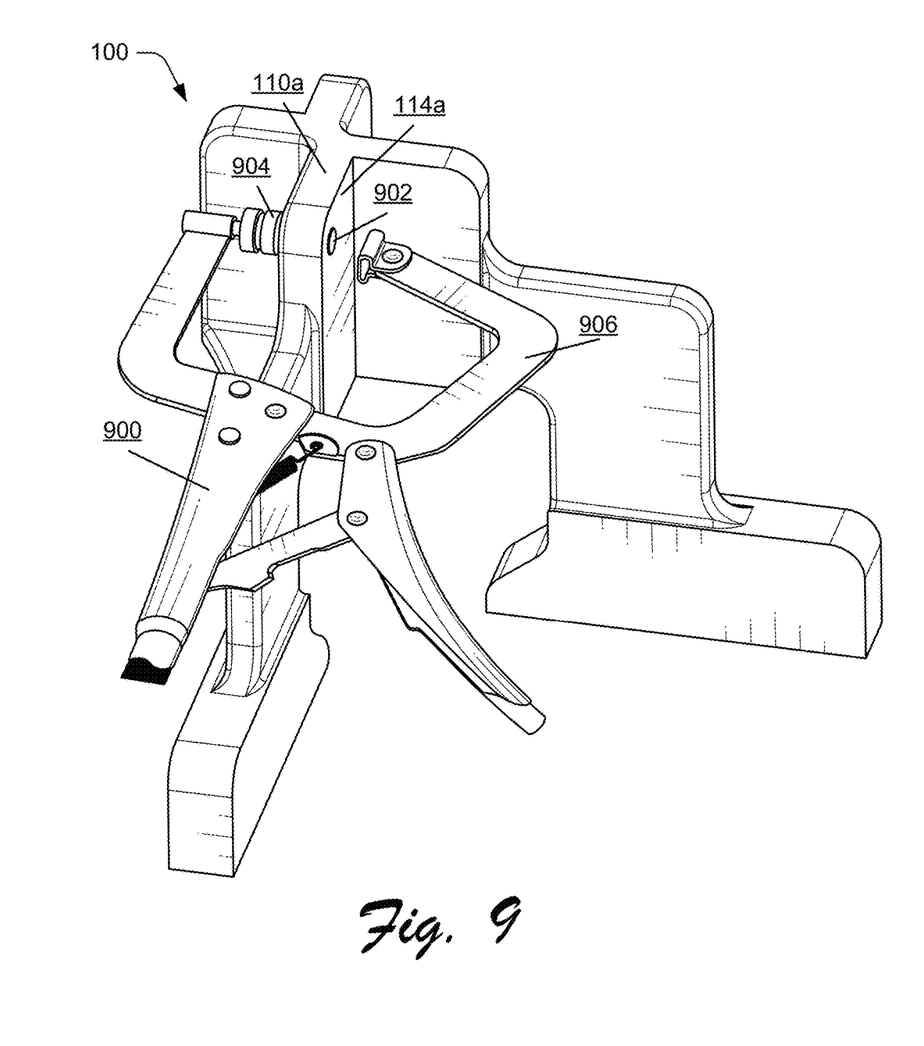
FIG. 9 depicts a scenario for utilizing an integratable clamp with a multi-axis alignment tool in accordance with one or more implementations.

FIG. 9 depicts a scenario for utilizing an integratable clamp 900 with the multi-axis alignment tool 100. The clamp 900, for instance, represents any suitable type of clamp capable of temporarily securing a workpiece to an alignment surface of the multi-axis alignment tool 100, such as a spring-activated clamp. In this particular example the clamp 900 is temporarily attached to the multi-axis alignment tool 100. The multi-axis alignment tool 100, for instance, includes a tapped (e.g., threaded) aperture 902 into which a threaded attachment 904 of the clamp 900 is inserted via threaded engagement. Thus, threaded engagement of the threaded attachment 904 within the tapped aperture 902 temporarily attaches the clamp 900 to the multi-axis alignment tool 100 such that a clamp arm 906 of the clamp 900 can open and close to clamp workpieces against the multi-axis alignment tool 100. While the tapped aperture 902 is depicted here as being positioned within the first internal member 110*a* for workpiece clamping against the internal surface 114*a*, it is to be appreciated that instances of the tapped aperture and/or any other type of aperture are placeable at any suitable location of the multi-axis alignment tool 100 for workpiece clamping against any of the alignment surfaces described herein.

Figure 10:
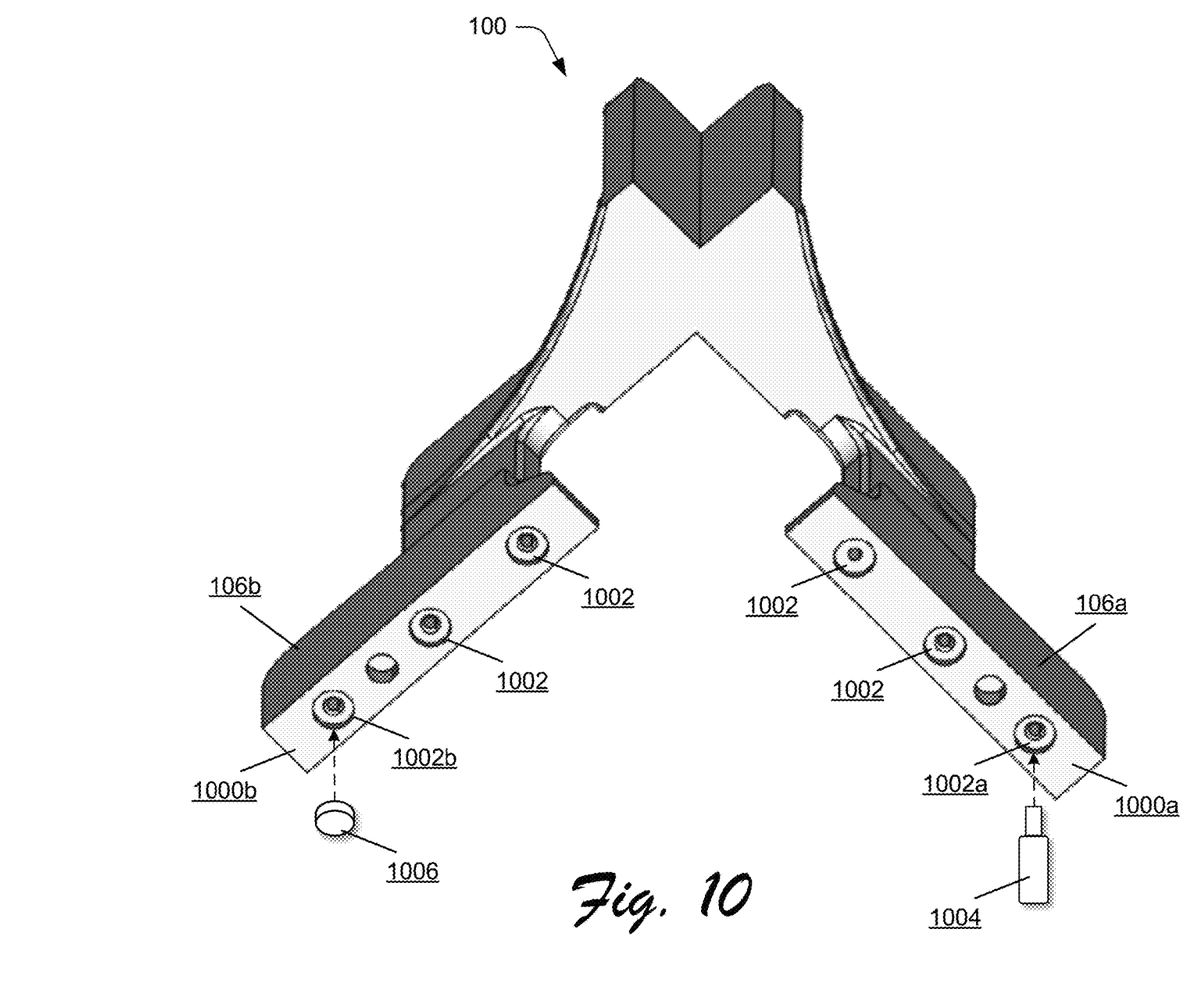
FIG. 10 depicts an underside view of a multi-axis alignment tool in accordance with one or more implementations.

FIG. 10 depicts an underside view of the multi-axis alignment tool 100 that includes the foot 106a with a bottom surface 1000a and the foot 106b with a bottom surface 1000b. Further, the bottom surfaces 1000a, 1000b include apertures 1002 that are usable in various ways to enable the multi-axis alignment tool 100 to be removably fastened to a work surface. Generally, the apertures 1002 are configurable in different ways to enable a variety of different attachment mechanisms. For instance, consider an aperture 1002a into which a pin 1004 can be affixed, e.g., temporarily attached. The pin 1004, for example, is affixable into the aperture 1002a using different mechanisms such as threaded attachment, magnetic attachment, fictive attachment, and so forth. In at least one implementation the aperture 1002a is implemented as a counterbore into which the pin 1004 is affixable. For instance, affixing the pin 1004 into the aperture 1002a causes a portion of the pin 1004 to protrude from the bottom surface 1000a such that the pin 1004 is placeable into a gridded surface, such as a tabletop work surface with a grid of holes. Generally, by placing multiple pins 1004 into multiple of the apertures 1002, the multiple pins 1004 are placeable into multiple grid holes of a gridded work surface to prevent lateral movement of the multi-axis alignment tool 100 relative to the work surface. This enables more accurate workpiece manipulation by reducing movement of the multi-axis alignment tool 100.

In another example, a magnet 1006 is affixable into an aperture 1002b, such as via magnetic attachment, threaded attachment, adhesive attachment, fictive attachment, and so forth. Generally, by affixing the magnet 1006 into the aperture 1002b and/or multiple apertures 1002, the multi-axis alignment tool 100 is magnetically attachable to a magnetically attracted surface, such as a metallic work surface. Generally, this reduces movement of the multi-axis alignment tool 100 relative to a work surface and thus enables more accurate workpiece manipulation by reducing movement of the multi-axis alignment tool 100. In at least some implementations, a combination of pins 1004 and magnets 1006 can be placed into different apertures 1002 for the multi-axis alignment tool 100 to provide for a variety of different work surface attachment scenarios.

Figure 11:
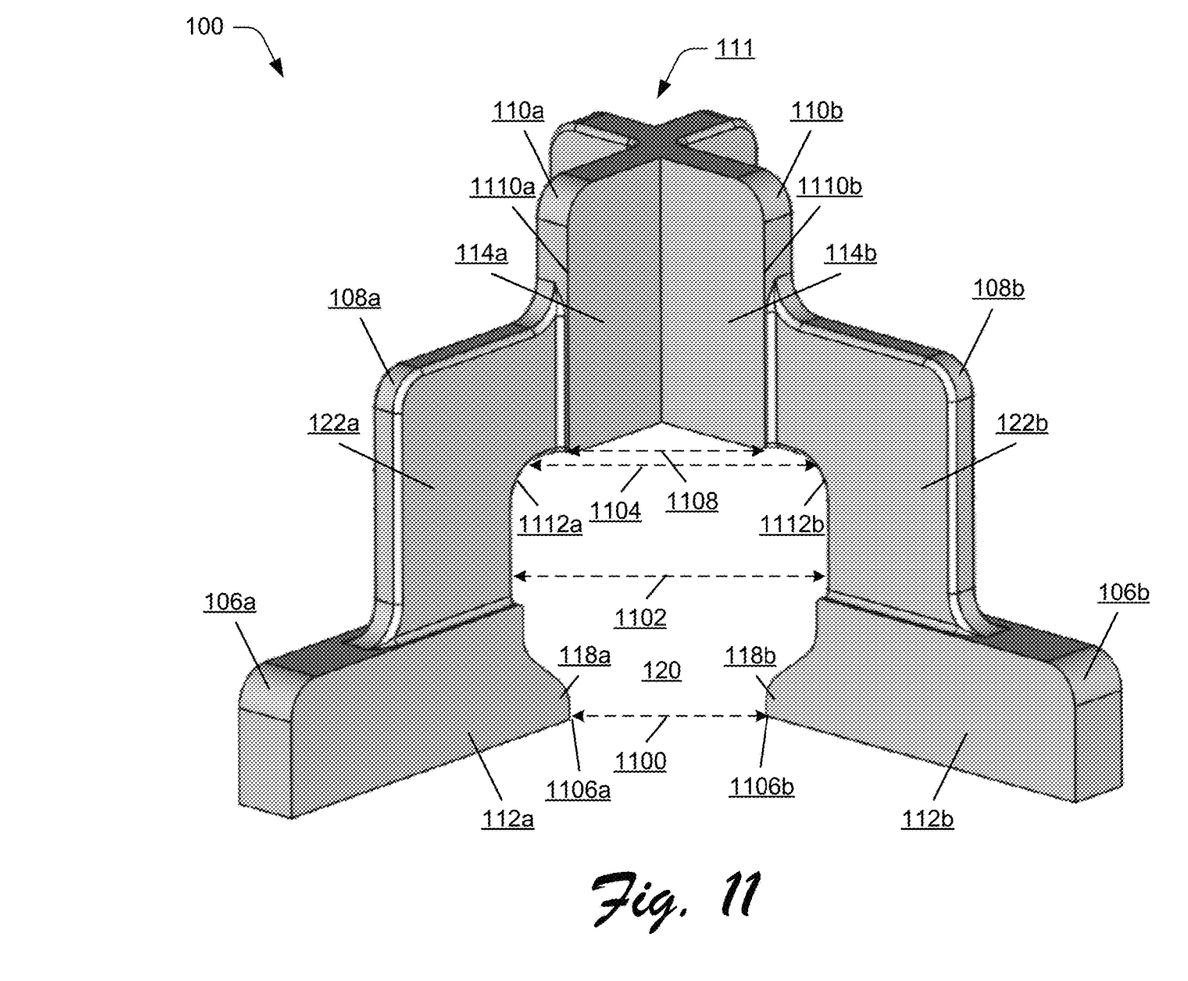
FIG. 11 depicts example dimensions of an access space of a multi-axis alignment tool in accordance with one or more implementations.

FIG. 11 depicts example dimensions of the access space 120 in accordance with one or more implementations. In this particular example the access space 120 includes a lower width 1100, an intermediate width 1102, and an upper width 1104. The lower width 1100, for instance, represents a width of the access space 120 bounded by an innermost edge 1106a of the internal surface 112a of the foot 106a and an innermost edge 1106b of the internal surface 112b of the foot 106a. The innermost edges 1106a, 1106b, for instance, represent lower interior corners of the toe regions 118a, 118b, respectively. The intermediate width 1102 represents a width of the access space 120 at an intermediate point of the access space 120, such as a vertical midpoint of the access space 120. The upper width 1104 represents a width of the access space 120 at an upper point, such as an uppermost width of the access space 120.

Also illustrated is a width 1108 which represents a width between an outer edge 1110a of the internal member 110a and an outer edge 1110b of the internal member 110b. The width 1108, for example, represents an outer width of the concave alignment structure formed by the internal surfaces 114a, 114b. In at least one implementation, the width 1100 of the access space 120 is equal to or greater than the width 1108. Further, in at least some implementations, the widths 1102, 1104 are greater than the width 1100 and/or the width 1108. Although not specifically illustrated here, in at least one implementation, the width 1100 is equal to or greater than an outer width of the concave alignment structure formed by the internal surfaces 206a, 206b of the alignment wings 104a, 104b.

In this particular example, the widths 1102, 1104 define a distance between an inner edge 1112a of the spanning member 108a and an inner edge 1112b of the spanning member 108b. The inner edges 1112a, 1112b, form a portion of an exterior perimeter of the access space 120. In at least one implementation, the inner edges 1112a, 1112b are curved between the foot 106a and the foot 106b and the internal members 110a, 110b, respectively, and thus form a curvature of a perimeter of the access space 120. Thus, the access space 120 is dimensioned to enable workpieces of varying sizes to be placed to traverse the access space from the interior portion to the exterior portion, such as depicted in FIG. 8.

Figure 12:
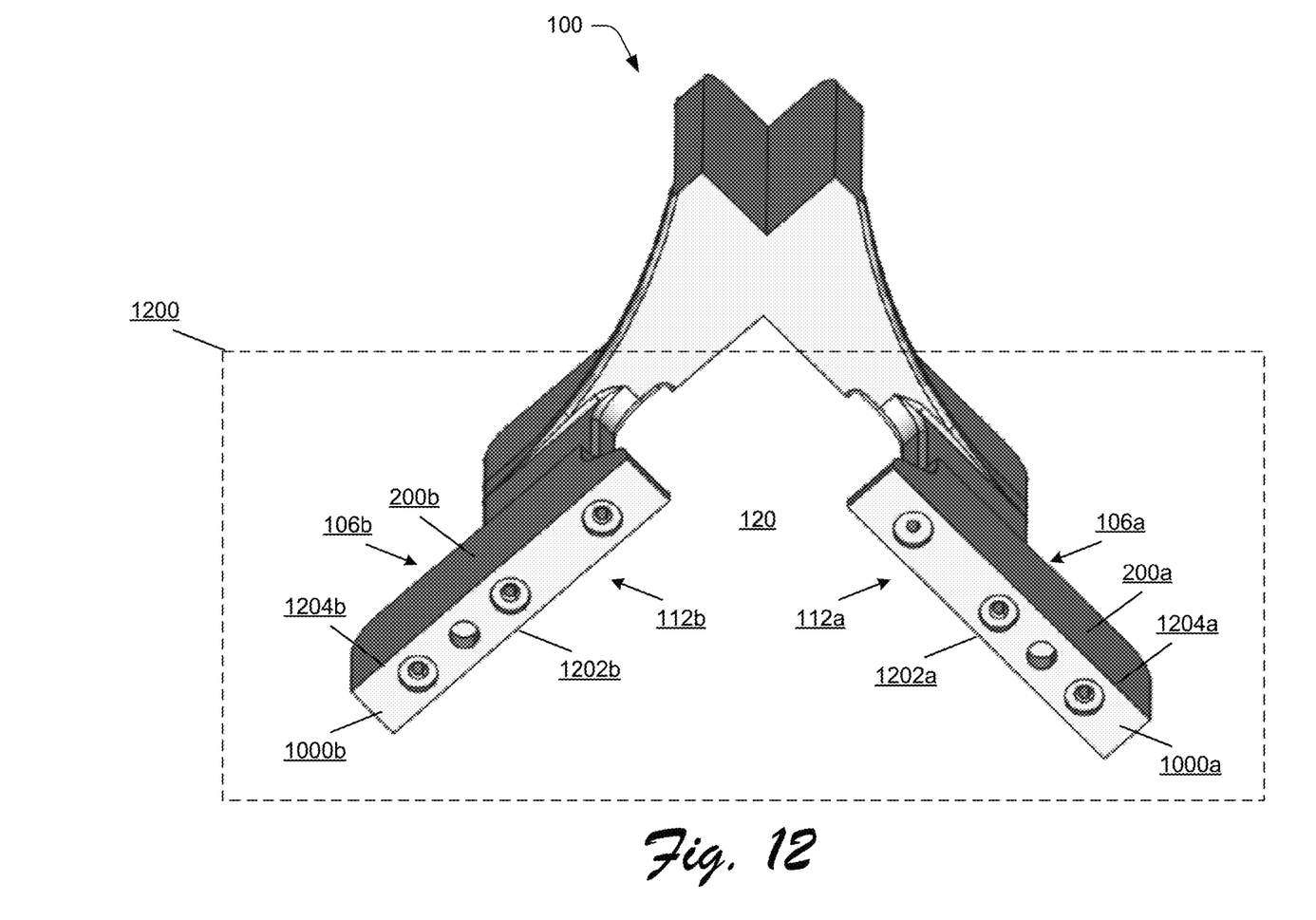
FIG. 12 depicts an underside view of a multi-axis alignment tool in accordance with one or more implementations.

FIG. 12 depicts an underside view of the multi-axis alignment tool 100 in accordance with one or more implementations. This particular view illustrates that the bottom surface 1000a of the foot 106a and the bottom surface of the foot 106b are coplanar with a horizontal plane 1200 that extends through the bottom surfaces 1000a, 1000b. For instance, a bottom edge 1202a of the interior alignment surface 112a, a bottom edge 1202b of the interior alignment surface 112b, a bottom edge 1204a of the exterior alignment surface 200a, and a bottom edge 1204b of the exterior alignment surface 200b are coplanar with the plane 1200. Generally, this enables workpieces that are placed through the access space 120 to be coplanar with both interior and exterior regions of the multi-axis alignment tool 100.

CONCLUSION

Accordingly, multi-axis alignment tools and techniques are described. The multi-axis alignment tools are usable to ensure consistent and durable alignment of various workpieces while providing access for performing attachment techniques thereon, which is not possible using conventional tools and techniques. Access spaces provide a user simultaneous access to points around a joint formed by objects aligned to the alignment surfaces. In this way, the multi-axis alignment tools provide accessibility that allows a user to operate upon a workpiece, e.g., as by joining aligned objects together, without interfering or obstructing access to the objects.

Although the invention has been described in language specific to structural features and/or methodological acts, it is to be understood that the invention defined in the appended claims is not necessarily limited to the specific features or acts described. Rather, the specific features and acts are disclosed as example forms of implementing the claimed invention.

What is claimed is:

1. A multi-axis alignment tool comprising:
a first alignment member with a first foot and a first internal member;
a second alignment member with a second foot and a second internal member;
wherein: an internal surface of the first foot forms a first interior alignment surface, an internal surface of the second foot forms a second interior alignment surface, an internal surface of the first internal member forms a third interior alignment surface, and an internal surface of the second internal member forms a fourth interior alignment surface; the first alignment member and the second alignment member are connected at the first internal member and the second internal member; and the first foot and the second foot form an open access space such that the first foot and the second foot are not directly interconnected;

a first alignment wing formed codirectionally with the first internal member and extending outwardly opposite the first internal member; and a second alignment wing formed codirectionally with the second alignment member and extending outwardly opposite the second internal member, wherein an external surface of the first foot forms a first exterior alignment surface, an external surface of the second foot forms a second exterior alignment surface, an internal surface of the first alignment wing forms a third exterior alignment surface, and an internal surface of the second alignment wing forms a fourth exterior alignment surface.

2. A multi-axis alignment tool as described in claim 1, further comprising a first spanning member connecting the first foot to the first internal member, and a second spanning member connecting the second foot to the second internal member.

3. A multi-axis alignment tool as described in claim 2, further wherein a surface of the first spanning member and a surface of the second spanning member are recessed relative to the first interior alignment surface and the second interior alignment surface, respectively.

4. A multi-axis alignment tool as described in claim 1, wherein the first internal member, the second internal member, the first alignment wing, and the second alignment wing form an x-shaped structure at an upper portion of the multi-axis alignment tool.

5. A multi-axis alignment tool as described in claim 1, wherein the first foot includes a first curved toe that points inwardly toward the open access space, and the second foot includes a second curved toe that points inwardly toward the open access space.

6. A multi-axis alignment tool as described in claim 1, wherein the first foot and the second foot each include one or more apertures configured to receive one or more pins for aligning the multi-axis alignment tool on a grid surface.

7. A multi-axis alignment tool as described in claim 6, wherein at least one of the one or more apertures is threaded such that the one or more pins are removably attachable via threaded attachment to the at least one of the one or more apertures.

8. A multi-axis alignment tool as described in claim 1, wherein the first foot and the second foot each include one or more apertures with one or more magnets installed within the one or more apertures.

9. A multi-axis alignment tool as described in claim 8, wherein the one or more magnets installed within the one or more apertures enables removable magnetic attachment of one or more pins for aligning the multi-axis alignment tool on a grid surface.

10. A multi-axis alignment tool as described in claim 1, wherein one or more of the first alignment member or the second alignment member includes at least one aperture that spans at least one of the first interior alignment surface and the first exterior alignment surface, or the second interior alignment surface and the second exterior alignment surface, the at least one aperture enabling an object to at least partially penetrate one or more of the first alignment member or the second alignment member.

11. A multi-axis alignment tool as described in claim 10, wherein the at least one apertures is tapped to enable threaded attachment of the object to the one or more of the first alignment member or the second alignment member.

12. A multi-axis alignment tool comprising:

a first alignment member including a first foot, a first internal member, and a first spanning member connecting the first foot to the first internal member;

a second alignment member including a second foot, a second internal member, and a second spanning member connecting the second foot to the second internal member, wherein: the first alignment member and the second alignment member are interconnected between the first internal member and the second internal member; the first alignment member and the second alignment member form a first interior alignment surface and a second interior alignment surface, respectively; and the first alignment member and the second alignment member are not directly interconnected between the first foot and the second foot;

a first alignment wing formed codirectionally with the first internal member and extending outwardly opposite the first internal member; and a second alignment wing formed codirectionally with the second internal member and extending outwardly opposite the second internal member, wherein an external surface of the first foot forms a first exterior alignment surface, an external surface of the second foot forms a second exterior alignment surface, an internal surface of the first alignment wing forms a third exterior alignment surface, and an internal surface of the second alignment wing forms a fourth exterior alignment surface.

13. A multi-axis alignment tool as described in claim 12, wherein the first internal member, the second internal member, the first alignment wing, and the second alignment wing form an x-shaped structure at an upper portion of the multi-axis alignment tool.

14. A multi-axis alignment tool as described in claim 13, wherein the x-shaped structure comprises a sole connectivity point for the first alignment member and the second alignment member.

15. A multi-axis alignment tool comprising:

an x-shaped alignment structure including a first portion with a first concave alignment surface and a second portion with a second concave alignment surface opposite the first concave alignment surface;

a first foot attached to a first section of the first portion of the x-shaped alignment structure and a second foot attached to a second section of the first portion of the x-shaped alignment structure, wherein:

an internal surface of the first foot forms a first interior alignment surface, an internal surface of the second foot forms a second interior alignment surface, and the first concave alignment surface forms a third interior alignment surface of the multi-axis alignment tool;

an external surface of the first foot forms a first exterior alignment surface, an external surface of the second foot forms a second exterior alignment surface, and the second concave alignment surface forms a third exterior alignment surface of the multi-axis alignment tool; and the x-shaped alignment structure, the first foot and the second foot define an access space beneath the x-shaped alignment structure and the first foot and the second foot are not directly interconnected.

16. A multi-axis alignment tool as described in claim 15, wherein a top surface of the x-shaped alignment structure is coplanar with a single horizonal plane relative to the multi-axis alignment tool.

17. A multi-axis alignment tool as described in claim 15, wherein the x-shaped alignment structure exhibits mirror-image geometry relative to a vertical plane that bisects the first concave alignment surface and the second concave alignment surface.

18. A multi-axis alignment tool as described in claim 15, wherein the first foot is indirectly attached to the first section of the first portion of the x-shaped alignment structure via a first spanning member that is recessed relative to the first foot and the first section of the first portion of the x-shaped alignment structure, and the second foot is indirectly attached to the second section of the first portion of the x-shaped alignment structure via a second spanning member that is recessed relative to the second foot and the second section of the first portion of the x-shaped alignment structure.

19. A multi-axis alignment tool as described in claim 18, wherein the access space comprises:

a first width between an innermost edge of the internal surface of the first foot and an innermost edge of the internal surface of the second foot;

a second width between an inner edge of the first spanning member and an internal edge of the second spanning member, wherein the second width is greater than the first width.

20. A multi-axis alignment tool as described in claim 15, wherein a bottom edge of the first interior alignment surface, a bottom edge of the first exterior alignment surface, a bottom edge of the second interior alignment surface, and a bottom edge of the second exterior alignment surface are coplanar on a horizonal plane.

\* \* \* \* \*